United States Patent
Jarvey et al.

(10) Patent No.: US 10,064,334 B2
(45) Date of Patent: Sep. 4, 2018

(54) BAG ASSEMBLY FOR A LAWN MOWER

(71) Applicant: Ariens Company, Brillion, WI (US)

(72) Inventors: Anne Jarvey, De Pere, WI (US); Alex Huss, Brillion, WI (US); Paul Ferrier, Brillion, WI (US); Thomas E. Phillip, Hilbert, WI (US)

(73) Assignee: Ariens Company, Brillion, WI (US)

( * ) Notice: Subject to any disclaimer, the term of this patent is extended or adjusted under 35 U.S.C. 154(b) by 159 days.

(21) Appl. No.: 15/054,996

(22) Filed: Feb. 26, 2016

(65) Prior Publication Data

US 2017/0245430 A1 Aug. 31, 2017

(51) Int. Cl.
*A01D 43/00* (2006.01)
*A01D 43/063* (2006.01)

(52) U.S. Cl.
CPC .............. *A01D 43/0636* (2013.01)

(58) Field of Classification Search
CPC .... A01D 34/71; A01D 43/0636; B65D 29/00; B65D 33/02
USPC .......................................................... 56/202
See application file for complete search history.

(56) References Cited

U.S. PATENT DOCUMENTS

| | | | |
|---|---|---|---|
| 3,492,800 A | 2/1970 | Peterson et al. | |
| 3,691,740 A | 9/1972 | Weber | |
| 3,726,069 A * | 4/1973 | Cope | A01D 34/71 56/202 |
| 4,175,603 A * | 11/1979 | Iaboni | A01D 43/063 383/25 |
| 4,214,424 A * | 7/1980 | Gobin | A01D 43/0631 56/16.6 |
| 4,258,538 A * | 3/1981 | Morse | A01D 43/063 383/120 |
| 4,306,408 A | 12/1981 | Christopherson et al. | |
| 4,566,257 A * | 1/1986 | Akrabawi | A01D 43/063 56/202 |
| 4,989,400 A * | 2/1991 | Wark | A01D 43/063 383/42 |
| 5,003,758 A * | 4/1991 | Bernstein | A01D 43/063 15/349 |
| 5,033,258 A * | 7/1991 | Morse | A01D 43/063 383/16 |
| 5,074,106 A | 12/1991 | DiPaolo | |
| 5,157,907 A | 10/1992 | Wolf | |
| 5,179,824 A * | 1/1993 | Ridge | A01D 43/063 56/202 |
| 5,365,727 A * | 11/1994 | Cross | A01D 43/063 56/194 |
| 5,449,083 A | 9/1995 | Dougherty et al. | |
| 5,794,425 A | 8/1998 | Thomason et al. | |
| 6,546,710 B1 * | 4/2003 | DeHart | A01D 43/063 56/199 |
| 8,051,635 B2 * | 11/2011 | Vineis | A01D 43/063 56/202 |
| 8,449,185 B1 | 5/2013 | Koon | |
| 2002/0166315 A1 | 11/2002 | Babineaux | |

(Continued)

*Primary Examiner* — Thomas B Will
*Assistant Examiner* — Mai T Nguyen
(74) *Attorney, Agent, or Firm* — Michael Best & Friedrich LLP

(57) ABSTRACT

A bag assembly for a utility machine includes a bag for collecting lawn debris and a frame supporting the bag. The frame defines a mouth configured to receive the lawn debris from the utility machine. The frame is expandable to vary a size of the mouth.

17 Claims, 4 Drawing Sheets

(56) References Cited

U.S. PATENT DOCUMENTS

2006/0168932 A1* 8/2006 Toporski .............. A01D 43/063
                                                                56/202
2006/0207236 A1    9/2006  Leonard
2010/0237203 A1    9/2010  Romero

* cited by examiner

BAG ASSEMBLY FOR A LAWN MOWER

FIELD OF THE INVENTION

The present invention relates to a bag assembly for a lawn mower.

SUMMARY

In one embodiment, the invention provides a bag assembly for a utility machine. The bag assembly includes a bag for collecting lawn debris, and a frame supporting the bag. The frame defines a mouth configured to receive the lawn debris from the utility machine. The frame is expandable to vary a size of the mouth.

In another embodiment, the invention provides a lawn mower including a frame, a prime mover supported by the frame, a handle assembly coupled to the frame, and a cutting deck mounted to the frame. The cutting deck has a discharge opening. The lawn mower further includes a cutting blade mounted below the mower deck to cut vegetation under the cutting deck, a plurality of wheels rotatably coupled to the frame to facilitate movement along a ground surface, and a bag assembly. The bag assembly includes a bag for collecting lawn debris, and a frame supporting the bag. The frame defines a mouth configured to receive the lawn debris from the discharge opening of the lawn mower. The frame is expandable to vary a size of the mouth.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
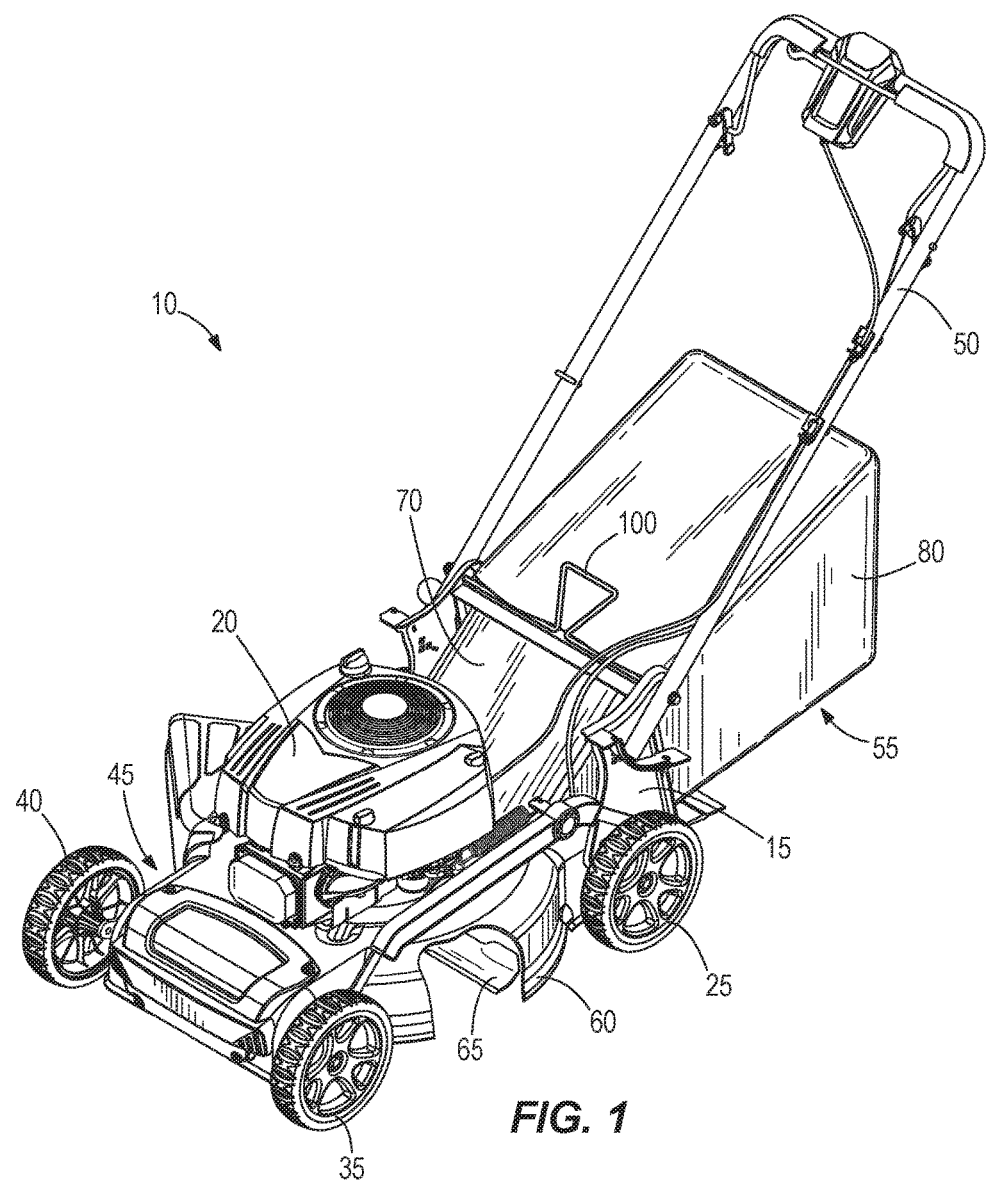
FIG. 1 is a perspective view of a walk-behind lawn mower including a bag assembly according to the present invention.

FIG. 1 illustrates a lawn mower 10 including a frame 15, a prime mover 20, left and right driven wheels 25 (only the left wheel 25 is shown), left and right passive wheels 35, 40, a deck assembly 45, a handle assembly 50, and a bag assembly 55. The terms "front," "rear," "left," and "right" will be used in this specification from the perspective of an operator using the lawn mower 10 during ordinary operation. The frame 15 is supported by the driven wheels 25 and passive wheels 35, 40, and in turn supports the other components of the lawn mower 10. The prime mover 20 may be, for example, a gasoline powered internal combustion engine, but may also be any other type of prime mover such as an electric motor, a hybrid gas/electric motor, a fuel cell, or any other suitable device operating on a suitable fuel.

The illustrated lawn mower 10 may be referred to as a walk-behind mowing unit because the operator walks behind the lawn mower 10 while either assisting in propelling or maneuvering the lawn mower 10. The bag assembly 55 discussed below is applicable to this type of lawn mower 10 and also to any other type of lawn mower having a bag assembly 55. Examples of other types of lawn mowers include zero radius turn mowers, sit down mowers, standing mowers (in which the operator stands during operation), and tractors (in which a steering wheel is used instead of control arms, and the mower is not designed to execute zero-radius turns).

The deck assembly 45 includes a cutting deck 60 and one or more cutting blades 65. The prime mover 20 drives rotation of the cutting blade 65 to cut vegetation (e.g., grass) under the cutting deck 60. In the illustrated embodiment, the cut vegetation and other debris is directed toward and through a discharge chute 70 of the cutting deck 60 in order to be collected. In other embodiments, the cut vegetation and other debris is mulched in the cutting deck 60 via the cutting blade 65.

Figure 2:
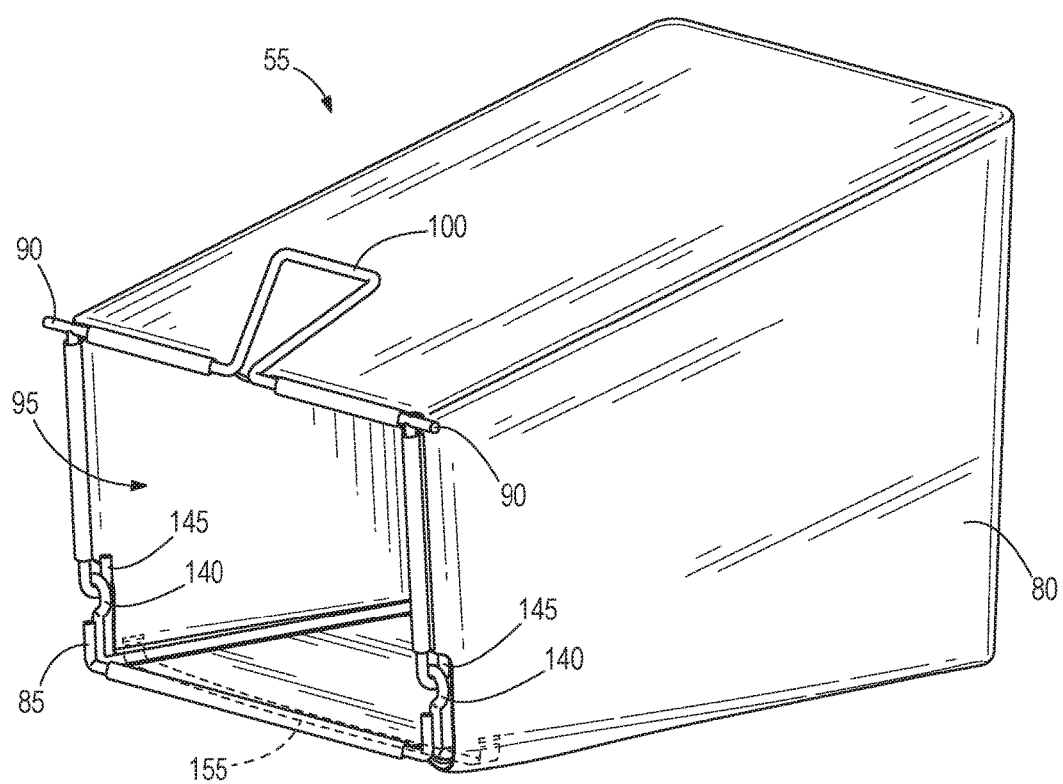
FIG. 2 is a perspective view of the bag assembly having a bag and a frame, the frame being in a first position.
Figure 3:
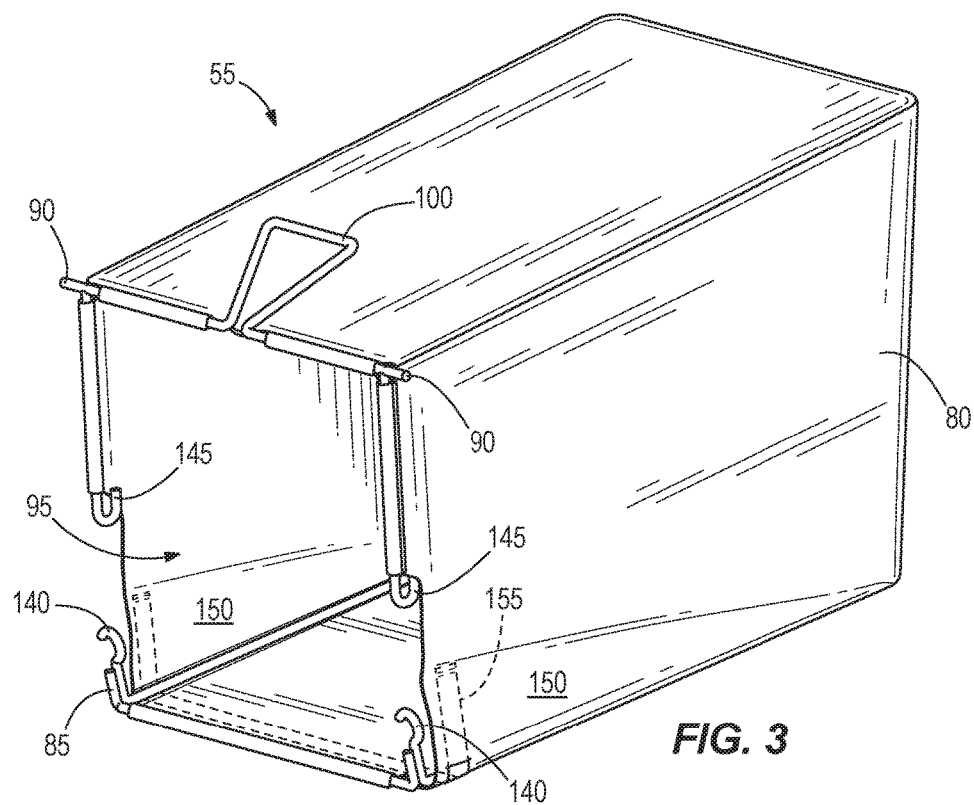
FIG. 3 is a perspective view of the bag assembly with the frame in a second position.

With reference to FIGS. 2 and 3, the illustrated bag assembly 55 of the lawn mower 10 selectively mounts to the rear of the lawn mower 10. The bag assembly 55 is a debris collection system, or container, that receives cut vegetation and other debris from the lawn mower (or other utility machines). In the illustrated embodiment, the bag assembly 55 includes a bag 80 for storing the cut vegetation and other debris and a bagger frame 85 (FIG. 4) for attaching the bag assembly 55 to the frame 15 of the lawn mower 10. Specifically, the bagger frame 85 includes two lateral protrusions 90 that are receivable within the frame 15 of the lawn mower 10 to selectively couple the bagger frame 85 to the lawn mower 10. The bagger frame 85 supports the bag 80 and defines a mouth 95 that interfaces with the discharge chute 70. The mouth 95 provides an inlet that allows the cut vegetation and other debris to enter the interior of the bag assembly 55 and pass into the bag 80 when the bag assembly 55 is coupled to the lawn mower 10. The mouth 95 also provides an outlet that allows the cut vegetation and other debris to be removed from the interior of the bag assembly 55 when the bag assembly 55 is disconnected from the lawn mower 10. The bagger frame 85 further includes a handle 100 for an operator to grasp when coupling or decoupling the bag assembly 55 to the lawn mower 10. The illustrated handle 100 is positioned adjacent the mouth 95 and projects upwardly from the bas assembly 55.

Figure 4:
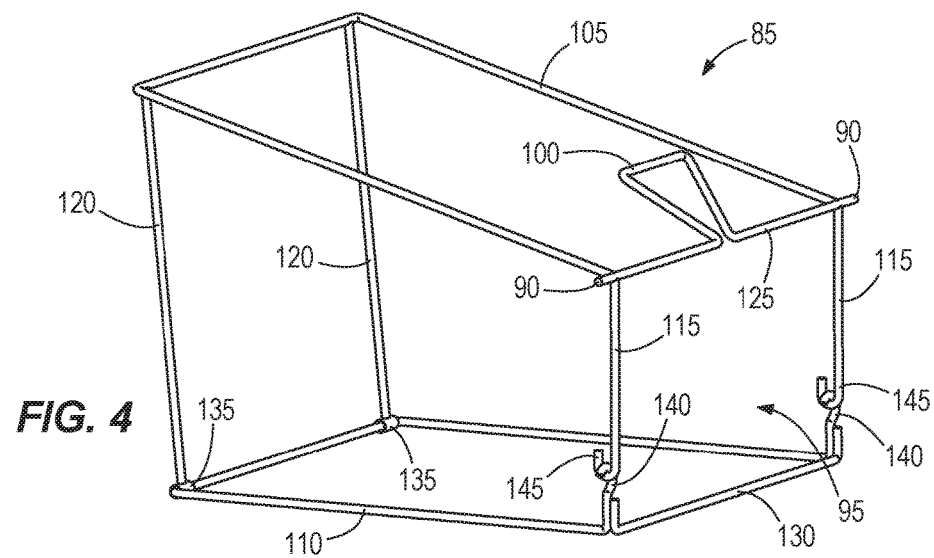
FIG. 4 is a perspective view of the frame of the bag assembly.

With reference to FIG. 4, the bagger frame 85 includes a top frame section 105, a bottom frame section 110 disposed opposite the top frame section 105, two front braces 115 extending between the top frame section 105 and the bottom frame section 110, and two rear braces 120 extending between the top frame section 105 and the bottom frame section 110. In the illustrated embodiment, the frame sections 105, 110 and the braces 115, 120 are metal rods that are secured together to create a wireframe-type assembly. The mouth 95 is defined by the front braces 115, a leading edge 125 of the top frame section 105, and a leading edge 130 of the bottom frame section 110. As illustrated in FIG. 3, the bagger frame 85 is expandable to vary the size of the mouth 95. Specifically, the bagger frame 85 is moveable between a first position when the bag assembly 55 is coupled to the lawn mower 10 and a second position when the bag assembly 55 is not coupled to the lawn mower 10. However, the bag assembly 55 remains in the first position when the bag assembly 55 is not coupled to the lawn mower 10 until the frame sections 105, 110 are moved relative to each other. In the illustrated embodiment, the bagger frame 85 is expandable via pivot joints 135 provided between the bottom frame section 110 and the rear braces 120. The pivot joints 135 enable the bottom frame section 110 to pivot relative to the top frame section 105.

Figure 5:
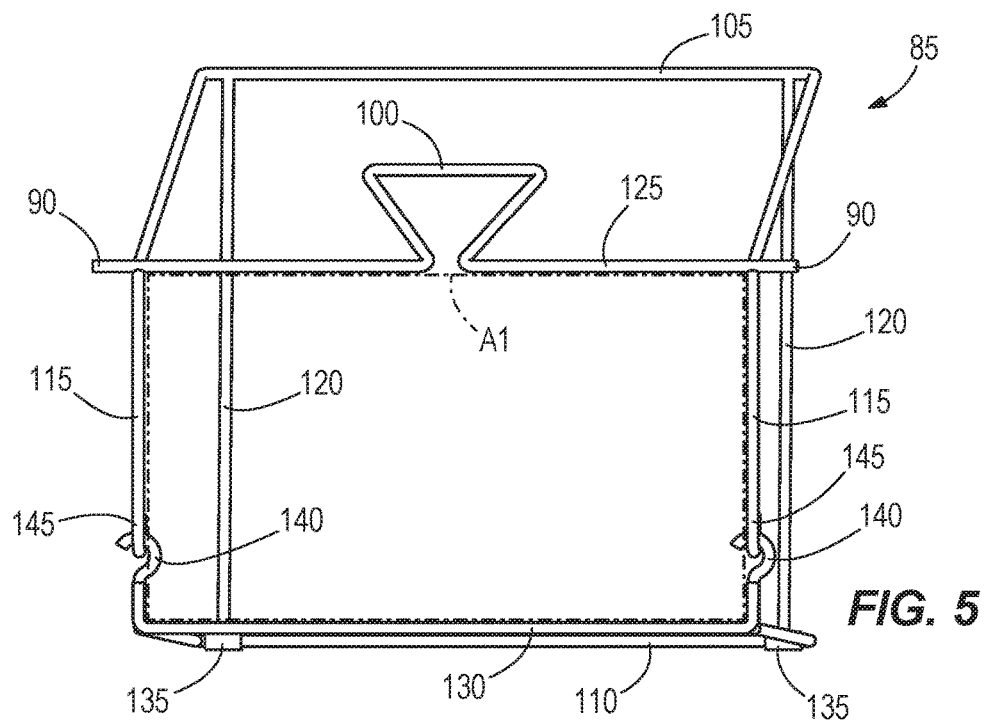
FIG. 5 is a front plan view of the frame in the first position.
Figure 6:
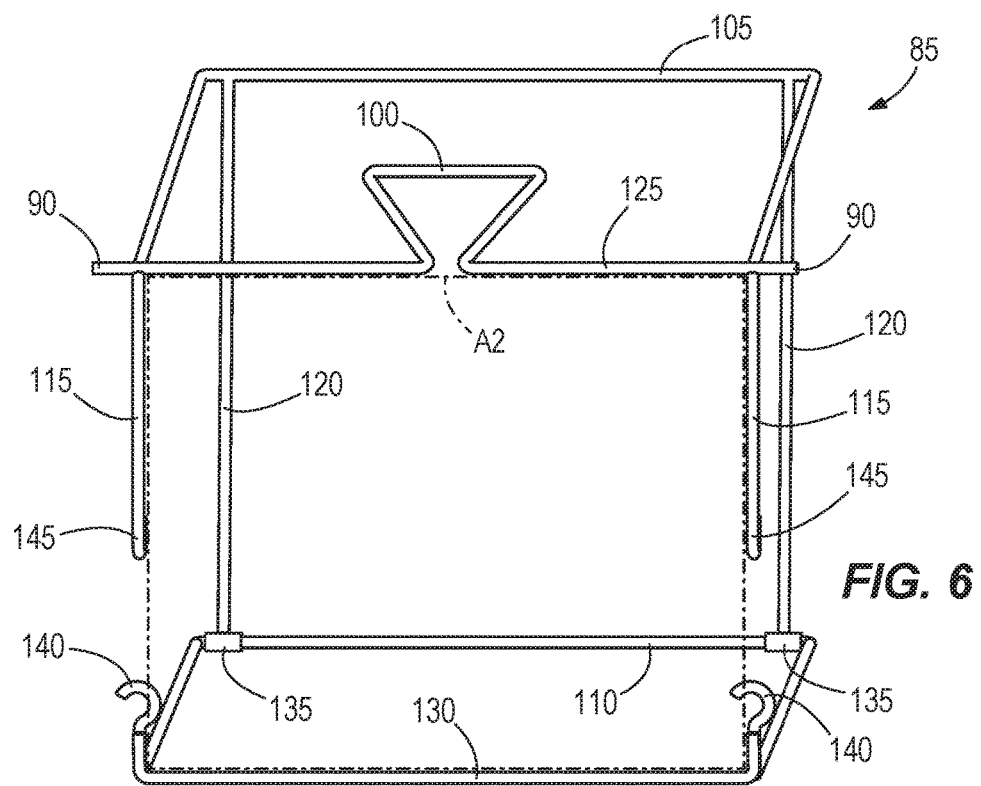
FIG. 6 is a front plan view of the frame in the second position.

With reference to FIGS. 5 and 6, the mouth 95 varies in size as a result of the expanding bagger frame 85. As shown in FIG. 5, the mouth 95 has a first area A1 (represented by the box in phantom lines) when the bagger frame 85 is in the first position and a second area A2 (represented by the box in phantom lines of FIG. 6) that is larger than the first area A1 when the bagger frame 85 is in the second position. When emptying the lawn debris from the bag 80, the lawn debris is inhibited from wedging or jamming in the bag assembly 55 because the size of the mouth 95 is increased from the first area A1 to the second area A2.

With reference to FIGS. 2-6, the bagger frame 85 further includes engagement members 140 and receiving members 145 to releasably secure the bagger frame 85 in the first position. In the illustrated embodiment, the engagement members 140 and the receiving members 145 are hooks that are integrally formed with the front braces 115. The receiving members 145 extend downwardly from the top frame section 105 proximate the leading edge 125, whereas the engagement members 140 extend upwardly from the bottom frame section 110 proximate the leading edge 130 toward the receiving members 145. The engagement members 140 are selectively coupleable with the receiving members 145. Specifically, the receiving members 145 receive the engagement members 140 when the bagger frame 85 is in the first position (FIG. 2), whereas the receiving members 145 and the engagement members 140 are not coupled when the bagger frame 85 is in the second position. Although the illustrated embodiment of the engagement and receiving members 140, 145 are hooks, in other embodiments, the engagement and receiving members 140, 145 can alternatively be magnets, snaps, cotter pins, or other releasable fasteners.

Referring to FIG. 3, the bag 80 is composed of a non-elastic canvas-type material. As such, the bag 80 includes a fold 150 having excess material to accommodate the expanding bagger frame 85. The fold 150 extends from the rear braces 120 to the front braces 115 on opposing sides of the bag 80. The bag 80 further includes a strap 155 (e.g., an elastic strap, a Velcro® strap, etc.) laterally disposed proximate the mouth 95 and the bottom frame section 110. The elastic strap 155 tucks any excess material of the fold 150 to avoid inadvertent snagging or catching of the fold 150 on various objects. Although the bag 80 of the illustrated embodiment is described as being a non-elastic canvas-type material, in other embodiments, the bag 80 may alternatively be composed of an elastic-type material such that the bag 80 is capable of stretching between the first position and the second position with the bagger frame 85. In such embodiments, the strap 155 may be omitted.

In operation, the lawn mower 10 can operate in a mulching setting or a bagging setting. In the event an operator desires to operate the lawn mower 10 in the bagging setting, an operator grasps the handle 100 of the bag assembly 55 to install and remove the bag assembly 55 from the lawn mower 10. To install, the operator aligns the mouth 95 of the bag assembly 55 with the discharge chute 70 of the lawn mower 10 and engages the two lateral protrusions 90 with a portion of the frame 15. Accordingly, the bagger frame 85 is in the first position when the bag assembly 55 is coupled to the lawn mower 10. At this point, an operator may begin collecting the lawn debris and cut vegetation within the bag 80 while the lawn mower 10 is running. When the bag 80 is full, an operator removes the bag assembly 55 from the lawn mower 10 by grasping the handle 100 and decoupling the two lateral protrusions 90 from the frame 15 of the lawn mower 10.

To empty lawn debris and cut vegetation from the bag 80, an operator expands the bagger frame 85 to allow the contents of the bag 80 to be easily emptied. In some embodiments, expanding the bagger frame 85 from the first position to the second position requires an operator to decouple or loosen the elastic strap 155 from the bag 80 and laterally displace the engagement members 140 slightly to provide sufficient clearance between the engagement and receiving members 140, 145. Once the engagement and receiving members 140, 145 disengage, the bottom frame section 110 can pivot about the pivot joints 135 away from the top frame section 105, resulting in the area of the mouth 95 increasing in size from the first area A1 (FIG. 5) to the second area A2 (FIG. 6). By expanding the size of the bagger frame 85 (and ultimately the area of the mouth 95) while emptying the bag 80, the lawn debris and cut vegetation is less likely to wedge or clog at the mouth 95 of the bag assembly 55. The contents of the bag assembly 55 can therefore be easily emptied.

Although the invention has been described with reference to an expandable bag assembly that removably connects to a lawn mower, in other embodiments, the expandable bag assembly may alternatively be connected to other types of utility machines, such as a lawn vacuums, lawn sweepers, street sweepers, reel mowers, dethatchers, grass gobblers, chippers, power vacuums, and the like.

Various features and advantages of the invention are set forth in the following claims.

What is claimed is:

1. A bag assembly for a utility machine, the bag assembly comprising:
   a bag for collecting lawn debris; and
   a frame supporting the bag, the frame defining a mouth configured to receive the lawn debris from the utility machine, the frame being expandable to vary a size of the mouth;
   wherein the frame is expandable from a first position when the bag assembly is coupled to the utility machine, to a second position when the bag assembly is not coupled to the utility machine;
   wherein the frame includes a receiving member and an engagement member selectively coupled to the receiving member to hold the frame in the first position, and wherein the engagement member is releasable from the receiving member to allow expansion of the frame to the second position.

2. The bag assembly of claim 1, wherein the mouth has a first area when the frame is in the first position, and wherein the mouth has a second area that is larger than the first area when the frame is in the second position.

3. The bag assembly of claim 1, further comprising a strap coupled to a portion of the bag wherein the strap tucks excess material of the bag when the frame is in the first position.

4. The bag assembly of claim 1, wherein the engagement member and the receiving member include hooks.

5. The bag assembly of claim 1, wherein the frame includes a top frame section and a bottom frame section disposed opposite the top frame section, and wherein the bottom frame section is movable relative to the top frame section to expand the frame.

6. The bag assembly of claim 5, wherein the bottom frame section is pivotable relative to the top frame section.

7. The bag assembly of claim 5, further comprising a set of front braces extending between the top frame section and the bottom frame section, and a set of rear braces extending between the top frame section and the bottom frame section, and wherein the mouth is defined by the set of front braces, a leading edge of the top frame section, and a leading edge of the bottom frame section.

8. The bag assembly of claim 7, wherein the bottom frame section is pivotably coupled to the set of rear braces.

9. The bag assembly of claim 1, further comprising a handle coupled to the frame for an operator to grasp.

10. A lawn mower comprising:
    a frame;
    a prime mover supported by the frame;
    a handle assembly coupled to the frame;
    a cutting deck mounted to the frame, the cutting deck having a discharge opening;
    a cutting blade mounted below the mower deck to cut vegetation under the cutting deck;
    a plurality of wheels rotatably coupled to the frame to facilitate movement along a ground surface; and
    a bag assembly including
        a bag for collecting lawn debris, and
        a frame supporting the bag, the frame defining a mouth configured to receive the lawn debris from the discharge opening of the lawn mower, the frame being expandable to vary a size of the mouth;
    wherein the frame is expandable from a first position when the bag assembly is coupled to the lawn mower, to a second position when the bag assembly is not coupled to the lawn mower;
    wherein the frame includes a receiving member and an engagement member selectively coupled to the receiving member to hold the frame in the first position, and wherein the engagement member is releasable from the receiving member to allow expansion of the frame to the second position.

11. The lawn mower of claim 10, wherein the mouth has a first area when the frame is in the first position, and wherein the mouth has a second area that is larger than the first area when the frame is in the second position.

12. The lawn mower of claim 10, wherein the engagement member and the receiving member includes hooks.

13. The lawn mower of claim 10, wherein the frame includes a top frame section and a bottom frame section disposed opposite the top frame section, and wherein the bottom frame section is movable relative to the top frame section to expand the frame.

14. The lawn mower of claim 13, wherein the bottom frame section is pivotable relative to the top frame section.

15. The lawn mower of claim 13, further comprising a set of front braces extending between the top frame section and the bottom frame section, and a set of rear braces extending between the top frame section and the bottom frame section, and wherein the mouth is defined by the set of front braces, a leading edge of the top frame section, and a leading edge of the bottom frame section.

16. The lawn mower of claim 15, wherein the bottom frame section is pivotably coupled to the set of rear braces.

17. A bag assembly for a utility machine, the bag assembly comprising:
    a bag for collecting lawn debris;
    a frame supporting the bag, the frame defining a mouth configured to receive the lawn debris from the utility machine, the frame being expandable to vary a size of the mouth;
    wherein the frame includes a top frame section and a bottom frame section disposed opposite the top frame section, and wherein the bottom frame section is movable relative to the top frame section to expand the frame;
    a set of front braces extending between the top frame section and the bottom frame section; and
    a set of rear braces extending between the top frame section and the bottom frame section, wherein the mouth is defined by the set of front braces, a leading edge of the top frame section, and a leading edge of the bottom frame section.

* * * * *